United States Patent
Goto

(10) Patent No.: US 10,150,887 B2
(45) Date of Patent: Dec. 11, 2018

(54) COMPOSITION FOR SOLID COATING FORMATION AND TUBULAR THREADED JOINT

(71) Applicants: NIPPON STEEL & SUMITOMO METAL CORPORATION, Tokyo (JP); VALLOUREC OIL AND GAS FRANCE, Aulnoye-Aymeries (FR)

(72) Inventor: Kunio Goto, Kobe (JP)

(73) Assignees: NIPPON STEEL & SUMITOMO METAL CORPORATION, Tokyo (JP); VALLOUREC OIL AND GAS FRANCE, Aulnoye-Aymeries (FR)

(*) Notice: Subject to any disclaimer, the term of this patent is extended or adjusted under 35 U.S.C. 154(b) by 784 days.

(21) Appl. No.: 14/426,924

(22) PCT Filed: Sep. 10, 2013

(86) PCT No.: PCT/JP2013/074356
§ 371 (c)(1),
(2) Date: Mar. 9, 2015

(87) PCT Pub. No.: WO2014/042144
PCT Pub. Date: Mar. 20, 2014

(65) Prior Publication Data
US 2015/0210888 A1 Jul. 30, 2015

(30) Foreign Application Priority Data
Sep. 12, 2012 (JP) .................. 2012-200118

(51) Int. Cl.
*F16L 15/04* (2006.01)
*C09D 179/08* (2006.01)
(Continued)

(52) U.S. Cl.
CPC ........ *C09D 179/08* (2013.01); *C08G 73/028* (2013.01); *C08K 5/41* (2013.01);
(Continued)

(58) Field of Classification Search
CPC ....... F16L 15/08; F16L 19/0243; F16L 58/04; F16L 58/12; F16L 58/182; F16L 15/04
(Continued)

(56) References Cited

U.S. PATENT DOCUMENTS 5,137,310 A  8/1992  Noel et al.
6,027,145 A  2/2000  Tsuru et al.
(Continued)

FOREIGN PATENT DOCUMENTS

EP  2 216 576 A1  8/2010
EP  2302273 A1  3/2011
(Continued)

OTHER PUBLICATIONS

Extended European Search Report for European Application No. 13836965.7, dated Apr. 28, 2016.
(Continued)

*Primary Examiner* — David Bochna
(74) *Attorney, Agent, or Firm* — Birch, Stewart, Kolasch & Birch, LLP

(57) ABSTRACT

A composition for solid coating formation, includes a mixed solvent including water and a dipolar aprotic solvent, a powdery organic resin which is partially soluble at least in the dipolar aprotic solvent. The powdery organic resin is dissolved or dispersed in the mixed solvent.

6 Claims, 3 Drawing Sheets

(51) Int. Cl.
*C10M 173/02* (2006.01)
*C09D 163/00* (2006.01)
*F16L 58/18* (2006.01)
*C09D 179/02* (2006.01)
*C08G 73/02* (2006.01)
*C08K 5/41* (2006.01)
*C09D 127/18* (2006.01)
*E21B 17/042* (2006.01)
*F16L 15/00* (2006.01)
*C08K 3/04* (2006.01)

(52) U.S. Cl.
CPC ......... *C09D 127/18* (2013.01); *C09D 163/00* (2013.01); *C09D 179/02* (2013.01); *C10M 173/02* (2013.01); *E21B 17/042* (2013.01); *F16L 15/00* (2013.01); *F16L 15/04* (2013.01); *F16L 58/182* (2013.01); *C08K 3/04* (2013.01); *C10M 2213/062* (2013.01); *C10M 2217/044* (2013.01); *C10N 2250/121* (2013.01); *F16L 2201/40* (2013.01)

(58) Field of Classification Search
USPC .................................................. 285/333, 334
See application file for complete search history.

(56) References Cited

U.S. PATENT DOCUMENTS

| | | | | |
|---|---|---|---|---|
| 6,933,264 | B2* | 8/2005 | Petelot | F16L 58/182 285/333 |
| 6,971,681 | B2* | 12/2005 | Dell'Erba | F16L 58/182 285/333 |
| 7,208,227 | B2 | 4/2007 | Tomihashi et al. | |
| 8,052,173 | B2* | 11/2011 | Carcagno | F16L 58/182 285/333 |
| 2003/0159764 | A1 | 8/2003 | Goto | |
| 2008/0129044 | A1 | 6/2008 | Carcagno et al. | |
| 2011/0041924 | A1 | 2/2011 | Mohan et al. | |
| 2011/0217541 | A1* | 9/2011 | Shimano | C09D 5/006 428/323 |
| 2014/0284919 | A1* | 9/2014 | Goto | F16L 15/04 285/94 |

FOREIGN PATENT DOCUMENTS

| | | |
|---|---|---|
| JP | 5-87275 A | 4/1993 |
| JP | 2003-74763 A | 3/2003 |
| JP | 2007-63482 A | 3/2007 |
| JP | 2008537062 A | 9/2008 |
| JP | 2008-256023 A | 10/2008 |
| JP | 2009-1767 A | 1/2009 |
| WO | WO 96/10710 A1 | 4/1996 |
| WO | WO 2006/104251 A1 | 10/2006 |
| WO | WO 2009/014009 A1 | 1/2009 |
| WO | WO 2009/072486 A1 | 6/2009 |

OTHER PUBLICATIONS

International Search Report, dated Dec. 10, 2013, issued in PCT/JP2013/074356.

Written Opinion of the International Searching Authority, dated Dec. 10, 2013, issued in PCT/JP2013/074356.

Japnese Office Action and English translation thereof dated Jan. 5, 2016 for counterpart Application No. 2014-535546.

* cited by examiner

COMPOSITION FOR SOLID COATING FORMATION AND TUBULAR THREADED JOINT

TECHNICAL FIELD

The present invention relates to a composition for solid coating formation used to fasten a tubular threaded joint which connects steel pipes such as oil well pipes, and a tubular threaded joint having a solid coating formed by using the composition for solid coating formation.

Priority is claimed on Japanese Patent Application No. 2012-200118, filed on Sep. 12, 2012, and the content of which is incorporated herein by reference.

BACKGROUND ART

Oil well pipes such as tubing or casings are used for drilling an oil well to mine crude oil or gas oil. The oil well pipes are connected (fastened) to each other generally using a tubular threaded joint. The depth of an oil well according to the related art was 2000 m to 3000 m. The depth of a deep oil well such as an undersea oil well in recent years may reach 8000 m to 10,000 m.

On the tubular threaded joint for the oil well pipes, a load called an axial tensile force caused by the masses of the oil well pipes and the joint themselves under the use environment, a complex pressure such as internal and external surface pressures, and geothermal heat are exerted. Therefore, for the tubular threaded joint for the oil well pipes, maintaining gastightness is required without breakage under such severe environments.

A typical tubular threaded joint (called special threaded joint) used for tightening the oil well pipes has a pin-box structure. The pin-box structure is constituted by a member called a pin which is formed at both end portions of the oil well pipes, and a member called a box which is formed on the inner surfaces of both sides of a threaded joint component (coupling). The pin has male threads. The box has female threads. Seal portions are respectively formed at the outer peripheral portion near the end surface on the tip end side of the pin from the male threads and at the inner peripheral surface of the base portion of the female threads of the box. Shoulder portions (also called torque shoulders) are respectively formed at the end surface of the tip end of the pin and at the corresponding innermost portion of the box.

One end (pin) of the oil well pipe is inserted into the threaded joint component (box) and the male threads and the female threads are fastened until the shoulder portions of the pin and the box abut on each other and interfere with each other at an optimum torque. Accordingly, the seal portions of the pin and the box come into close contact with each other and form a metal-to-metal seal, thereby ensuring gastightness of the threaded joint. The seal portions and the shoulder portions form unthreaded metal contact portions of the tubular threaded joint. The unthreaded metal contact portions and the threaded portions (the male threads and the female threads) become surfaces (called contact surfaces of the tubular threaded joint) that come into contact with each other during fastening. An example of the special threaded joint is described in Patent Document 1 and Patent Document 2.

During an operation of lowering the oil well pipe to an oil well, due to various problems, the oil well pipe is temporarily pulled up from the oil well, and a threaded joint which is fastened once is loosened to release the fastening of the threaded joint. There is a case that the oil well pipe in which the fastening of the threaded joint is loosened is lowered after re-fastening the joint. API (The American Petroleum Institute) requires seizure resistance in such a sense that even when fastening (make-up) of a threaded joint and loosening (break-out) thereof are performed a plurality of times, seizure called galling does not occur and gastightness is maintained. For example, ten successful times are required for a tubing joint, and three successful times are required for a casing joint.

At the time of fastening, in order to achieve enhancement in seizure resistance and gastightness, a viscous liquid lubricant (grease lubricant), that is called a "compound grease", containing a large amount of heavy metal powder is applied to the contact surfaces of the threaded joint. Such a compound grease is specified in the Standard API BUL 5A2.

For the purpose of enhancing the maintenance of the compound grease and improving lubricity, surface treatments for a single layer or two or more layers, such as a nitriding treatment, various plating processes including zinc-based plating and dispersion plating, and a phosphate chemical conversion treatment are performed on the contact surfaces of the threaded joint. However, there is a problem with the use of the compound grease in that there is concern about a harmful effect on the environment or human bodies as described below.

The compound grease contains a large amount of heavy metal powder such as zinc, lead, and copper. Particularly, there is a possibility that harmful heavy metals such as lead that is contained in the compound grease may have a harmful effect on the environment, marine organisms, and the like. Further, an operational environment is worsened by an operation of applying the compound grease, and there is a concern about a harmful effect on human bodies.

In recent years, upon the opportunity that OSPAR Convention (the Oslo and Paris Conventions, OSPAR) regarding the prevention of ocean pollution of the northeast Atlantic Ocean has taken effect since 1998, environment restrictions have strictly proceeded on a global scale. Accordingly, the use of the compound grease is also restricted in some regions. Therefore, in the operation of drilling a gas well or oil well, in order to avoid the harmful effect on the environment or human bodies, a threaded joint capable of exhibiting excellent seizure resistance without the use of the compound grease has been required.

As a threaded joint which can be used for fastening oil well pipes without the compound grease being applied, in Patent Document 3, a threaded joint for an oil well in which a resin coating containing lubricating powder is formed on the contact surfaces thereof is suggested. In addition, the applicant suggested a tubular threaded joint in which a solid coating is formed on each of a pin and a box in Patent Document 4.

PRIOR ART DOCUMENT

Patent Document

[Patent Document 1] Japanese Unexamined Patent Application, First Publication No. H05-87275

[Patent Document 2] Specification of U.S. Pat. No. 5,137,310

[Patent Document 3] PCT International Publication No. WO96/10710

[Patent Document 4] PCT International Publication No. WO2009/072486

DISCLOSURE OF THE INVENTION

Problem that the Invention is to Solve

In many cases, a period of time over one year from shipment is needed for transport to the field or storage of a tubular threaded joint until the tubular threaded joint is actually fastened in an oil well. In the meanwhile, the tubular threaded joint may be exposed to severe environments such as sea transport through the hot and humid equator, temperature changes of about 90° C. from high temperatures (daytime) to below the freezing point (nighttime) in the Middle East area, and temperature changes of from −60° C. (winter) to 40° C. (summer) in the Arctic Circle.

In a case where the tubular threaded joint according to the related art is exposed to an environment with an extremely severe hot and cold cycle, which is repeatedly exposed to an extremely low temperature to a high temperature of about 100° C., cracking may occur due to the deterioration of a solid coating or the solid coating may peel off due to the degradation in the adhesiveness of the solid coating. Therefore, there is concern that a problem in which performance required by the solid coating cannot be exhibited may occur.

In the special threaded joint provided with the seal portions and the shoulder portions, the seal portions of the pin and the box form the metal-to-metal seal during fastening, thereby ensuring gastightness. However, when the solid coating partially peels off, not only seizure resistance but also gastightness is degraded.

Further, an operational environment in which the oil well pipes are fastened is also affected by a very wide range of temperatures of from a high temperature environment of 40° C. or higher in the Middle East area and the like to a low temperature environment of about −40° C. in the Arctic Circle and the like. Therefore, it is expected to exhibit sufficient seizure resistance even when the temperature at the time of fastening is a severe temperature such as an extremely low temperature or an extremely high temperature. Even from this point, there is concern that the performance of the solid coating according to the related art may be insufficient.

An object of the present invention is to provide a composition for solid coating formation of a tubular joint capable of forming a solid coating capable of maintaining and exhibiting seizure resistance, gastightness, and antirust properties without including harmful heavy metals such as lead which imposes a burden on the earth environment even in a hot and cold cycle of from an extremely low temperature to a high temperature during a period of time of over one year for transport or storage until actual fastening and even when the temperature at the time of fastening is an extremely high temperature or an extremely low temperature, and a tubular threaded joint having excellent hot and cold cycle performance by using the same.

Another object of the present invention is to provide a composition for solid coating formation of a tubular joint capable of forming a solid coating by only using materials with a small environmental burden without the use of an organic solvent having a harmful effect on biotic environment, and a tubular threaded joint using the same.

Means for Solving the Problems

The present invention employs the following means in order to accomplish the objects to solve the problems. That is, (1) A composition for solid coating formation according to an aspect of the present invention, includes: a composition made by containing, in a mixed solvent including water and a dipolar aprotic solvent, a powdery organic resin which is partially soluble at least in the dipolar aprotic solvent, in which the powdery organic resin is present in a state of being dissolved or dispersed in the mixed solvent.

(2) The composition for solid coating formation described in (1) may further include lubricating particles.

(3) In the composition for solid coating formation described in (1) or (2), the powdery organic resin may be one or more types selected from a polyamide-imide resin, an epoxy resin, and a fluororesin.

(4) In the composition for solid coating formation described in any one of (1) to (3), the dipolar aprotic solvent may be one or more types selected from N-methylpyrrolidone, dimethylacetamide, dimethylformamide, dimethylsulfoxide, and γ-butyrolactone.

(5) A tubular threaded joint according to another aspect of the present invention includes: a pin and a box each of which is provided with a contact surface including a threaded portion and a unthreaded metal contact portion, in which the contact surface of at least one member of the pin and the box has a solid coating formed from the composition described in any one of (1) to (4).

(6) In the tubular threaded joint described in (5), the solid coating may have a first layer which does not contain lubricating particles and a second layer formed thereon, which contains lubricating particles.

(7) The tubular threaded joint described in (5) or (6), a thickness of the solid coating (a total thickness in a case of a coating having two or more layers) may be 5 μm to 100 μm.

In the present invention, the "dipolar aprotic solvent" is an organic solvent made from polar molecules having an electric dipole moment in the molecules and means a solvent that does not substantially have a proton donating property.

In the present invention, "be partially soluble at least in the dipolar aprotic solvent" means "be dissolved in the dipolar aprotic solvent at a concentration of 5 mass % or higher at room temperature or during heating".

Advantage of the Invention

According to the aspects, not only the solid coating itself, which is formed on the contact surfaces of the tubular threaded joint, but also the composition for solid coating formation for forming the solid coating contains only the components which have no or a low environmental burden. The solid coating does not contain harmful heavy metals which are contained in a compound grease according to the related art. Therefore, the manufacturing environment of the tubular threaded joint is properly maintained, and environmental (for example, ocean) pollution during fastening is prevented.

Moreover, the solid coating has excellent hot and cold cycle performance, properly maintains the adhesiveness of the coating even in a hot and cold cycle of from an extremely low temperature (−60° C.) to a high temperature (90° C.). Furthermore, the solid coating exhibits seizure resistance even when a temperature during fastening is an extremely low temperature of −40° C. Therefore, the tubular threaded joint does not significantly deteriorate in seizure resistance and antirust performance even in such a hot and cold cycle, and continuously exhibits a lubricating function even when fastening and loosening are repeated, thereby ensuring gastightness after fastening. Furthermore, even when the tubular threaded joint is exposed to a high temperature close to 300° C. in a high-temperature well, fastening can be released at the time of pulling an oil well pipe without seizure.

As described in Comparative Examples, which will be described later, even the compound grease, which has been generally regarded as a material having higher seizure resistance than a solid lubricating coating, is significantly degraded in seizure resistance when the fastening temperature is a low temperature of −20° C. The solid coating formed by using the composition for solid coating formation according to the aspects of the present invention exhibits higher performance than the compound grease under a hot and cold cycle environment and at a low temperature of −20° C. or less even though heavy metals particles are not contained.

BEST MODE FOR CARRYING OUT THE INVENTION

Hereinafter, an embodiment of the present invention will be described in detail.

Figure 1:
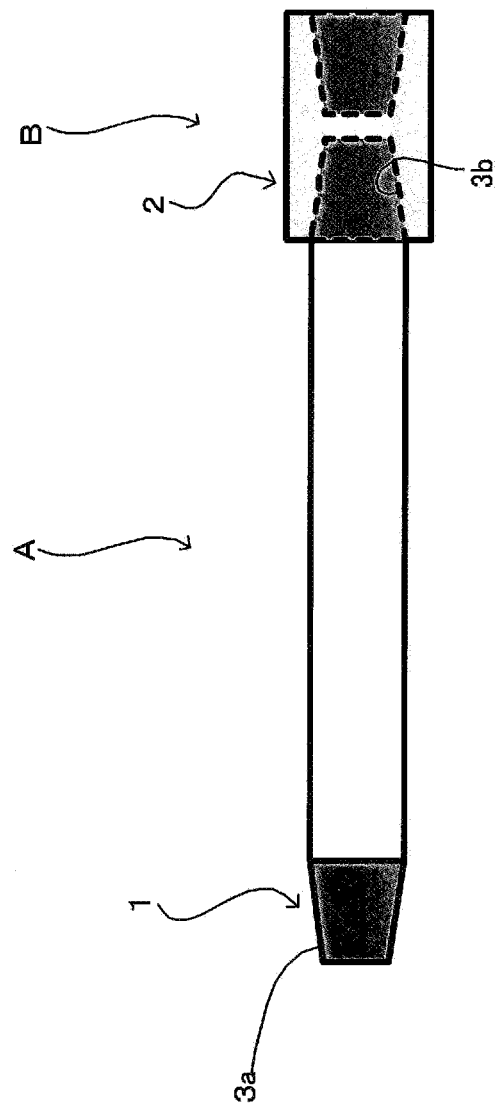
FIG. 1 is a diagram schematically illustrating an assembled configuration of a steel pipe and a threaded joint component during shipment of the steel pipe.

FIG. 1 is a diagram schematically illustrating a state of a steel pipe for an oil well pipe and a threaded joint component during shipment.

Both ends of a steel pipe A are provided with pins 1 formed to have male threaded portions 3a. The male threaded portions 3a are formed on the outer surface of the pin 1. Both sides of a threaded joint component (coupling) B are provided with boxes 2 formed to have female threaded portions 3b. The female threaded portions 3b are formed on the inner surface of the box 2. The pin 1 is a threaded joint member having the male threaded portion 3a. The box 2 is a threaded joint member having the female threaded portion 3b. The tubular threaded joint is constituted by the pin 1 and the box 2.

The coupling B is fastened to one end of the steel pipe A in advance. Although not illustrated, to the pin 1 of the steel pipe A and the box 2 of the coupling B which are not fastened, protectors for protecting the threaded portions 3a and 3b are respectively mounted before shipment, and the protectors are taken off before the use of the tubular threaded joint.

In the tubular threaded joint, as illustrated, the pins 1 are formed on the outer surfaces of both ends of the steel pipe A, and the boxes 2 are formed on the inner surfaces of the coupling B which is a separate member. However, although not illustrated, there is also an integral type tubular threaded joint in which one end of the steel pipe A is a pin and the other end thereof is a box without the use of the coupling B. The present invention can be applied to a tubular threaded joint in any of the above types.

Figure 2:
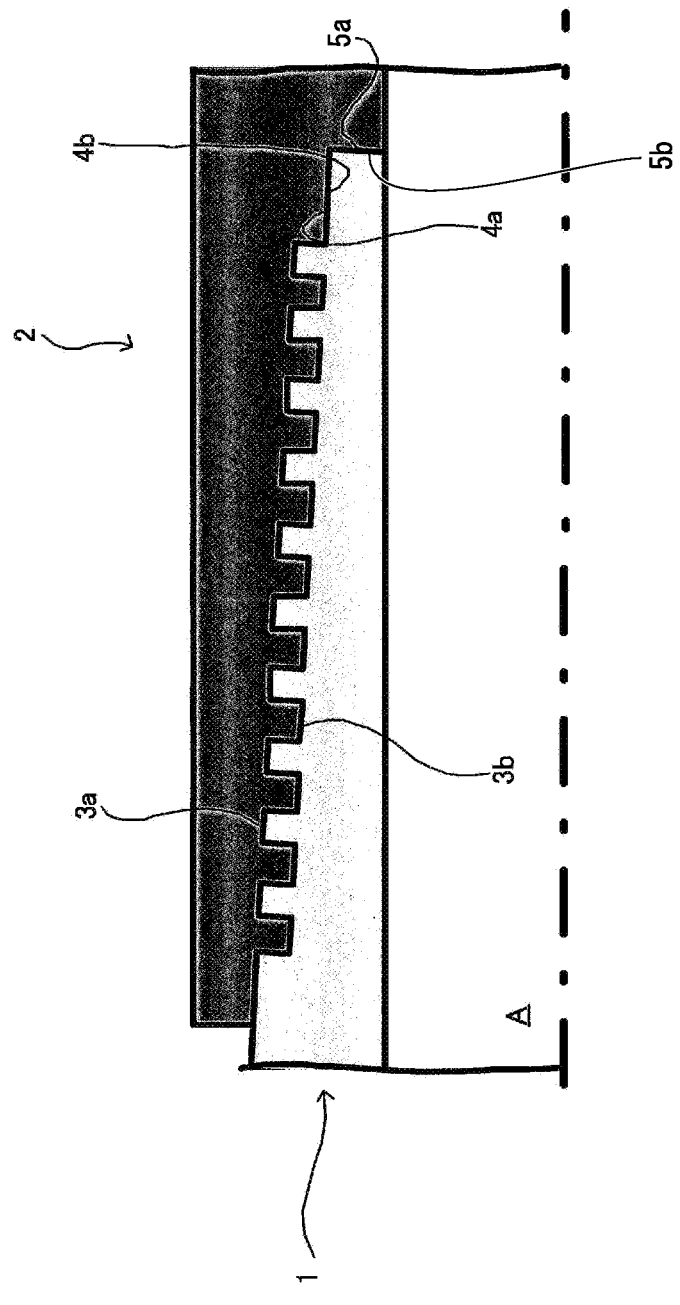
FIG. 2 is a diagram schematically illustrating fastening portions of a threaded joint.

FIG. 2 is a diagram schematically illustrating the configuration of the tubular threaded joint (hereinafter, simply referred to as a "threaded joint"). The threaded joint is constituted by the pin 1 formed on the outer surface of the end portion of the steel pipe A and the box 2 formed on the inner surface of the coupling B. The pin 1 includes the male threaded portion 3a, a seal portion 4a positioned on the tip end side of the steel pipe A from the male threaded portion 3a, and a shoulder portion 5a positioned on the end side from the seal portion 4a. According to this, the box 2 includes the female threaded portion 3b, and a seal portion 4b positioned on the base end side from the female threaded portion 3b, and a shoulder portion 5b formed on the base end side from the seal portion 4b.

In any of the pin 1 and the box 2, the seal portions 4a and 4b and the shoulder portions 5a and 5b constitute unthreaded metal contact portions. The unthreaded metal contact portions and the threaded portions 3a and 3b are contact surfaces of the threaded joint. The contact surfaces require seizure resistance, gastightness, and corrosion resistance. For this, in the related art, a compound grease containing heavy metal powder is applied, or a viscous liquid, a semisolid, or a solid lubricating coating is formed on contact surfaces. However, as described above, the former has a harmful effect on human bodies and the environment. The latter has problems in that gastightness is degraded during a hot and cold cycle of from an extremely low temperature to a high temperature or results in deterioration in lubricity and antirust properties are deteriorated.

According to this embodiment, the contact surface of at least one member of the pin 1 and the box 2 of the threaded joint has a specific solid coating, which will be described later in detail, thereby solving the above-described problems. The solid coating is preferably formed on the entire surface of the contact surface of the pin 1 and/or the box 2, but may also be formed on only a part of the contact surface, for example, the unthreaded metal contact portions (that is, the seal portions 4a and 4b and the shoulder portions 5a and 5b). In this case, a different coating may be formed on the residual part of the contact surface.

Further, in a case where the solid coating described above is formed on only the contact surface of one member of the pin 1 and the box 2, a different surface treatment may also be performed on the contact surface of the other member. For example, a solid anticorrosive coating or a liquid lubricating coating may also be formed on the contact surface of the other member.

[Solid Coating]

In this embodiment, on the contact surfaces at least including the unthreaded metal contact portions (the seal portions 4a and 4b and the shoulder portions 5a and 5b) of at least one member of the pin 1 and the box 2 of the threaded joint, a solid coating is formed by using a composition for solid coating formation which is a composition containing, in a mixed solvent of water and a dipolar aprotic solvent, a powdery organic resin that is partially soluble at least in the dipolar aprotic solvent, the powdery organic resin being present in a state of being dissolved or dispersed in the mixed solvent.

The composition for solid coating formation may further contain lubricating particles. Accordingly, the lubricity of the solid coating is enhanced. Therefore, the seizure resistance of the threaded joint is enhanced.

As the powdery organic resin, a resin having heat resistance at a temperature of higher than 100° C. is preferably used. As such a resin, a polyamide-imide resin, an epoxy resin, a fluororesin, and the like, which are commercially available in a powdery or dispersed liquid state, can be exemplified, and a mixture including two or more types thereof may also be used.

Among these, the polyamide-imide (PAI) resin is preferable as the powdery organic resin because it has particularly excellent in heat resistance, can maintain the coating strength and toughness at a temperature of 300° C. without the significant degradation therein, and also has excellent wear resistance and chemical resistance.

As the powdery polyamide-imide resin, Torlon (registered trademark) 4000T and 4000TF made by SOLVAY can be exemplified. The Torlon polyamide-imide resin is commercially available in a powdery form having a particle size of about 30 µm to 40 µm and is completely soluble in the dipolar aprotic solvent.

As another example of the powdery organic resin, there are an epoxy resin and a fluororesin which are reformed so that the surfaces thereof partially increase hydrophilicity. There may be cases where such a resin is commercially available in a water-dispersed liquid state. Even in this case, a treatment for changing a solvent to the above-mentioned mixed solvent is necessary.

In this embodiment, the powdery organic resin (hereinafter, simply referred to as an "organic resin") is dispersed in the mixed solvent including water and the dipolar aprotic solvent and is mixed, thereby preparing a composition. Accordingly, the powdery organic resin is present in the mixed solvent in a dispersed state or a dissolved state depending on the solubility thereof. Both water and the dipolar aprotic solvent are used as the solvent because even when the organic resin is dissolved or is not dissolved in the dipolar aprotic solvent, the surfaces of the particles of the organic resin are reformed to be hydrophilic and thus dispersibility in water is enhanced.

As the mixed solvent, instead of a dipolar protic solvent represented by alcohol or amine, a dipolar aprotic solvent such as dimethylformamide is preferably used. Since the dipolar protic solvent such as alcohol has too high an affinity to water, there may be cases where it is difficult to achieve the effect intended by the present invention and there may be cases where the dissolving power of the organic resin is low.

As examples of the dipolar aprotic solvent, N-methylpyrrolidone (NMP), dimethylacetamide (DMAC), dimethylformamide (DMF), dimethylsulfoxide (DMSO), γ-butyrolactone (GBL), and the like may be used, and the dipolar aprotic solvent is not limited thereto. Among these, dimethylsulfoxide and γ-butyrolactone are preferable. Further, Torlon 4000T and 4000TF which are the polyamide-imide resin described above are soluble in the dipolar aprotic solvent. In a case where the amount of the dipolar aprotic solvent in the composition is a certain degree or higher and in a case where a temperature is high, the resin may be present in a state of being dissolved in the composition. Otherwise, for example, in a case where the ratio of water is high or a temperature is low, the resin is present in a dispersed state in the composition. Even in any of the forms being present, a homogeneous solid coating can be formed.

In a case where the powdery organic resin is another resin such as an epoxy resin and a fluororesin, or is a mixture of such a resin and the polyamide-imide resin, there is a small possibility of the powdery organic resin being dissolved in the mixed solvent. However, the surfaces of the powdery resin particles are reformed to be hydrophilic as described above. In addition, depending on the case, the surfaces of the resin particles are partially dissolved.

In a case where the solid coating contains lubricating particles, as the lubricating particles that can be used, although not limited, for example, there are molybdenum disulfide, tungsten disulfide, graphite, graphite fluoride, an organomolybdenum compound (for example, molybdenum dialkylthiophosphate and molybdenum dialkylthiocarbamate), PTFE (polytetrafluoroethylene), BN (boron nitride), and the like. PTFE is a type of fluororesin, but is not soluble in the dipolar aprotic solvent. Therefore, PTFE may not be used as the organic resin of the coating formation components. One type or two or more types may be used as the lubricating particles. As the lubricating particles, graphite is preferable, and among the types thereof, earthy graphite and PTFE are particularly preferable.

Regarding the amounts of the components in the composition for solid coating formation, it is preferable that when the total amount of the components excluding the lubricating particles is 100 mass %, the amount of water be in a range of 10 mass % to 50 mass %, the amount of the dipolar aprotic solvent be in a range of 25 mass % to 55 mass %, and the amount of the organic resin be in a range of 5 mass % to 25 mass %. Regarding the ratios of the water and the dipolar aprotic solvent, it is preferable that water occupy 12 mass % to 60 mass % of the entire solvent. The ratios of the water and the dipolar aprotic solvent may be set so that the obtained composition has an appropriate viscosity for application and a solid coating having a desired thickness can be formed by a single application operation.

In a case of forming a solid coating containing the lubricating particles, it is preferable that the lubricating particles be contained in the solid coating at a ratio of 2 mass % to 20 mass %.

The composition for solid coating formation may contain other addition components that can be contained in the solid coating. As an example of the components, there is an antirust agent. The antirust agent reinforces an inorganic powder for adjusting the lubricity of the solid coating and the solid coating. Examples of the inorganic powder include titanium dioxide and bismuth oxide. Preferable examples of the antirust agent include calcium ion-exchanged silica. Furthermore, a commercially available reaction water repellent agent can also be contained in the solid coating. The inorganic powder, the antirust agent, and the other addition components may be contained in the solid coating at a total amount of up to 20 mass %.

The solid coating may contain, in addition to the above-mentioned components, a small amount of addition components of at least one type or two or more types selected from a surfactant, a colorant, an antioxidant, a defoaming agent, and the like at an amount of, for example, 5 mass % or less. Moreover, the solid coating may also contain an extreme pressure agent, a liquid oil agent, and the like at a very small amount of 2 mass % or less.

The composition for solid coating formation can be prepared by adding the powdery organic resin that is soluble in the dipolar aprotic solvent as the coating formation component to the mixed solvent including the water and the water-miscible organic solvent, and stirring and mixing the resultant at an appropriate temperature to cause the organic resin to be dispersed or dissolved in the solvent. In a case where the solid coating contains the lubricating particles or the other addition components, thereafter, the addition components may be gradually added to form a uniform composition. It is preferable that the composition for solid coating formation be adjusted to an appropriate viscosity for stirring and application by setting the temperature to be in a range of 20° C. to 60° C. although it also depends on the properties of the dipolar aprotic solvent.

The composition for solid coating formation is applied to the contact surfaces of the threaded joint to be coated by an appropriate method, and is heated as necessary to dry and cure the coating, thereby forming the solid coating on the contact surfaces. Application can be performed by, for example, spraying the composition while rotating the threaded joint at a predetermined speed. In addition, application methods such as brushing or immersion can also be employed. The heating temperature is set so that the solvent is completely volatilized and the resin is cured.

The solid coating which uses the composition for solid coating formation can be formed as a single layer or two or more layers. In a case of the single layer, in order to enhance lubricity, it is preferable that solid coating be a coating containing the lubricating particles. However, depending on the type of water-dispersed resin, a solid coating without lubricating particles being contained may also impart sufficient seizure resistance to the threaded joint.

In a case of forming two or more layers of the solid coating, it is preferable that the first layer as the lower layer be a solid coating which is made of the organic resin and does not contain the lubricating particles in order to enhance coating adhesiveness and antirust properties. It is preferable that the second layer formed thereon be a solid coating which is made of the organic resin containing the lubricating particles in order to enhance lubricity (seizure resistance). Both the first layer and the second layer may contain the other addition components described above. Further, as the uppermost layer of the solid coating, a top coating layer (third layer) having antirust properties may also be provided.

In addition, in a case where the solid coating is formed in multiple layers, on a first layer that does not contain lubricating particles, a plurality of second layers containing lubricating particles may also be provided. In this case, it is preferable that the plurality of second layers be formed so that the ratio of the lubricating particles is increased from the lower layer to the upper layer. Accordingly, the solid coating having excellent coating adhesiveness and lubricity (seizure resistance) can be obtained.

In the case where the organic resin is the Torlon polyamide-imide resin, a preferable heating temperature after applying the composition for solid coating formation is as follows.

In the case where the solid coating is the single-layer coating, first, the composition for solid coating formation is applied onto the contact surfaces of the threaded joint. Thereafter, the composition is heated and maintained at 80 to 100° C. for 5 to 20 minutes for predrying. Next, the resultant is heated and maintained at 180 to 280° C. for 10 to 30 minutes for main heating for curing. In a case of another organic resin, a heating temperature or a heating time may be appropriately depending on the type of the used organic resin, and any of predrying or main heating may be omitted.

In the case of forming the solid coating having two or more layers, predrying and main heating as described above may be performed on each layer for forming the coating. In addition, after the first layer is applied and heated and maintained at 80 to 100° C. for 5 to 20 minutes for predrying, main heating may be not performed thereon, and the second layer may be applied and be subjected to main heating after the predrying. That is, main heating may be collectively performed on the first layer and the second layer.

In addition, the temperature or the holding time is a temperature measured at the contact surfaces of the threaded joint and is not the setting temperature or the holding time of a heating furnace.

It is preferable that the temperature of the contact surfaces of the threaded joint during application be atmosphere (about 20° C.). In addition, in order to reduce an operation time, the contact surfaces to be applied may be heated by setting the main heating temperature as the upper limit. In this case, it is preferable that the heating temperature be a temperature lower than the boiling points of the water and the dipolar aprotic solvent.

It is preferable that the thickness of the solid coating be 5 μm to 100 μm from the viewpoint of adhesiveness, seizure resistance, and antirust properties. In the case where the solid coating is two or more layers, the total thickness thereof is the thickness of the solid coating. When the thickness of the solid coating is less than 5 Jim, the lubricity of the tubular threaded joint is insufficient, and seizure is likely to occur at the time of fastening and loosening. Further, although the solid coating has a certain degree of antirust properties, when the thickness thereof is too small, antirust properties become insufficient, resulting in degradation in corrosion resistance of the contact surfaces. When the thickness of the solid coating is too large, it is difficult to sufficiently remove volatile materials such as moisture and the volatile materials are rapidly volatilized during the drying, heating, and curing treatments, and thus a coating with good smoothness in the surfaces thereof is not obtained. For this reason, the upper limit of the thickness of the solid coating is 100 μm. Considering the viewpoint of adhesiveness, a preferable upper limit of the thickness of the solid coating is 50 μm.

[Base Treatment]

Regarding the threaded joint having the solid coating formed on the contact surfaces of the pin 1 and/or the box 2, when a base treatment for roughening the contact surfaces is performed thereon before forming the solid coating on the contact surfaces to increase the surface roughness to be higher than 3 μm to 5 μm which is the surface roughness after a cutting process, seizure resistance is enhanced in many cases. Therefore, it is preferable that the contact surfaces be roughened by the base treatment before forming the solid coating.

Particularly, in the case where the solid coating is the single-layer coating containing the lubricating particles, there is a tendency to reduce coating adhesiveness compared to a coating without lubricating particles being contained. Therefore, it is preferable that the contact surfaces be roughened in advance. As a matter of course, even in the case where the solid coating is the laminated coating described above, when the contact surfaces are roughened by the base treatment, enhancement in seizure resistance is obtained in many cases.

As the subsurface treatment, for example, there is a blasting treatment of projecting a blast material such as a shot material having a spherical shape and a grid material having an angular shape. In addition, as the subsurface treatment, for example, there is pickling which damages the skin due to immersion in a strong acid liquid such as sulfuric acid, hydrochloric acid, nitric acid, and hydrofluoric acid. In addition, as the subsurface treatment, for example, there are a chemical conversion treatment such as a phosphatizing treatment, an oxalate treatment, or a borate treatment (the roughness of crystal surfaces increases as the generated crystals grow), electro plating of metals such as Cu, Fe, Sn, or Zn or an alloy thereof (since convex portions are preferentially plated, surfaces are slightly roughened), and impact plating in which a porous plated coating can be formed. In addition, as a type of electro plating, composite plating in which a plated coating is formed by dispersing solid fine particles in a metal is possible as a method of imparting roughness to surfaces because the solid fine particles protrude from the plated coating.

Even when the subsurface treatment for the contact surfaces is any of the methods, it is preferable that the surface roughness Rmax after roughening by the subsurface treatment be 5 μm to 40 μm. When Rmax is less than 5 μm, adhesiveness to the solid coating and maintenance of the coating may become insufficient. On the other hand, when Rmax exceeds 40 μm, frictional force is increased, and thus the coating may not bear shear strength and compressive force at a high surface pressure and may be easily broken or peel off. As the subsurface treatment for roughening, two or more treatments may be used in combination, and the treatment method may use well-known methods.

From the viewpoint of the adhesiveness of the solid coating, the subsurface treatment capable of forming a porous coating, that is, the chemical conversion treatment and the impact plating are preferable. In this case, in order for Rmax of the porous coating to be 5 μm or greater, it is preferable that the thickness thereof be 5 μm or greater. Although the upper limit of the thickness is not particularly specified, typically, a thickness of 50 μm or less, and preferably, a thickness of 40 μm or less is sufficient. When the solid coating is formed on the porous coating formed by the subsurface treatment, the adhesiveness thereof to the solid coating is increased due to the so-called "anchor effect". As a result, even when fastening and loosening are repeated, peeling of the solid coating is less likely to occur. Accordingly, metal-to-metal contact is effectively prevented, and thus seizure resistance, gastightness, and corrosion resistance are further enhanced.

Particularly preferable subsurface treatments for forming a porous coating are a phosphate chemical conversion treatment (a treatment using manganese phosphate, zinc phosphate, ferromanganese phosphate, or zinc calcium phosphate) and formation (porous metal plating) of a coating of zinc or an alloy of zinc and iron by impact plating. Among these, from the viewpoint of adhesiveness, a manganese phosphate coating is more preferable. On the other hand, from the viewpoint of corrosion resistance, a coating of zinc or an alloy of zinc and iron by which sacrificial corrosion resistance can be expected due to zinc is more preferable.

The phosphate chemical conversion treatment can be performed by immersion or spraying according to an ordinary method. As a chemical conversion treatment liquid, an acidic phosphate treatment liquid for general zinc plating can be used. For example, a zinc phosphate-based chemical conversion treatment using 1 to 150 g/L of phosphate ions, 3 to 70 g/L of zinc ions, 1 to 100 g/L of nitric acid ions, 0 to 30 g/L of nickel ions can be employed. In addition, a manganese phosphate-based chemical conversion treatment which is commonly used for a threaded joint can also be used. The temperature of the liquid may be atmosphere (room temperature) to 100° C., and the treatment time may be up to 15 minutes depending on a desired thickness. In order to accelerate the formation of the coating, before the phosphate treatment, an aqueous solution for surface adjustment, which contains a colloidal titanium may be supplied for surfaces to be treated. After the phosphate treatment, drying is preferably performed after water washing or hot-water washing.

The impact plating can be performed by mechanical plating in which particles and an object to be plated impact with each other in a rotating barrel or projection plating in which particles and an object to be plated impact with each other using a blasting device. In the threaded joint, plating may be performed only on the contact surfaces. Therefore, it is preferable to employ projection plating which enables local plating.

For example, a projection material made of particles obtained by coating the surfaces of iron-based nuclei with zinc or a zinc alloy is projected onto the contact surfaces to be coated. The content of zinc or the zinc alloy in the particles is preferably in a range of 20 mass % to 60 mass %. The particle diameters of the particles are preferably in a range of 0.2 mm to 1.5 mm. Through projection, only zinc or the zinc alloy which is the coating layer of the particle adheres to the contact surfaces which are the base body, and a porous coating made of zinc or the zinc alloy is formed on the contact surfaces. The projection plating enables a porous metal plated coating with good adhesiveness to be formed on the surface of steel regardless of the material of the steel.

The thickness of zinc or the zinc alloy formed by the impact plating is preferably 5 μm to 40 μm in terms of both corrosion resistance and adhesiveness. When the thickness is less than 5 μm, sufficient corrosion resistance cannot be ensured. When the thickness exceeds 40 adhesiveness to the solid coating may be degraded.

Two or more types of the above-described subsurface treatments may be combined to be performed.

As another subsurface treatment, although there is a slight roughening effect, specific single-layer or multiple-layer electro plating is performed, adhesiveness between the solid coating and the subsurface is increased, and the seizure resistance of the tubular threaded joint may be improved.

As the subsurface treatment for the solid coating, for example, electro plating using metals such as Cu, Sn, and Ni or an alloy thereof may be employed. Plating may be single-layer plating or multiple-layer plating for two or more layers. As specific examples of this type of electro plating, there are Cu plating, Sn plating, Ni plating, Cu—Sn alloy plating further described in Japanese Unexamined Patent Application, First Publication No. 2003-74763 Cu—Sn—Zn alloy plating, two-layer plating including Cu plating and Sn plating, and three-layer plating including Ni plating, Cu plating, and Sn plating. Particularly, in a tubular threaded joint manufactured from a steel type in which the Cr content exceeds 5%, seizure is very likely to occur. Therefore, it is preferable that single-layer plating of a Cu—Sn alloy or a Cu—Sn—Zn alloy, or multiple-layer metal plating using a combination of two or more types of plating selected from the alloy plating, Cu plating, Sn plating, and Ni plating be performed as the subsurface treatment. As the multiple-layer metal plating, for example, there are two-layer plating including Cu plating and Sn plating, two-layer plating including Ni plating and Sn plating, two-layer plating including Ni plating and Cu—Sn—Zn alloy plating, and three-layer plating including Ni plating, Cu plating, and Sn plating.

Such plating may be performed according to a method described in Japanese Unexamined Patent Application, First Publication No. 2003-74763. In the case of the multiple-layer plating, a plated coating (typically Ni plating) at the lowest layer is preferably a plated layer called strike plating, which has an extremely small thickness of 1 μm or less. It is preferable that the thickness of the plating (the total thickness in the case of the multiple-layer plating) be in a range of 5 μm to 15 μm.

As still another subsurface treatment, a solid anticorrosive coating treatment is also possible. The above-described solid coating is a viscous liquid or a semisolid as described above, and the surface thereof has slight stickiness. Particularly, the solid coating of the viscous liquid has high stickiness. As a result, particularly at the time of allowing the oil well pipe to stand upright, rust that remains on the inner surface or abrasive grains for abrasive blasting injected to remove the rust fall, and they may adhere to the solid coating and be buried into the solid coating. The foreign matter buried into the coating is not completely removed by air blowing or the like and causes degradation in lubricity. In order to solve this problem, a thin dried solid coating may also be formed on the upper layer of the solid coating. The dried solid coating may be a general resin coating (for example, an epoxy resin, a polyamide resin, a polyamide-imide resin, or a vinyl resin), and the coating can be formed from any of a water-based composition and an organic solvent-based composition. Further, a small amount of wax may be contained in the coating.

Figure 3A:
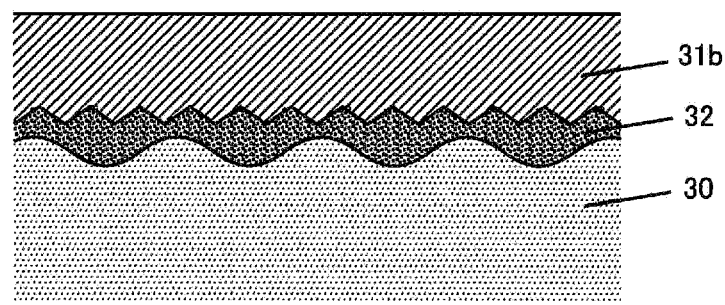
FIG. 3A is a diagram illustrating an example of a coating configuration of a tubular threaded joint according to an embodiment of the present invention.

FIG. 3A is a diagram schematically illustrating a coating structure in a case where a subsurface treatment layer (for example, a phosphate chemical conversion treatment coating or a porous metal plated coating formed by impact plating) 32 for roughening is first formed on the contact surface of a base body 30 that forms the pin 1 and/or the box 2 of the tubular threaded joint and a solid coating 31b, which contains the lubricating particles, is formed thereon. As described above, roughening may also be achieved by roughening the contact surface itself through, for example, sandblasting instead of forming the base treatment layer 32. Further, the solid coating may also not contain the lubricating particles.

Figure 3B:
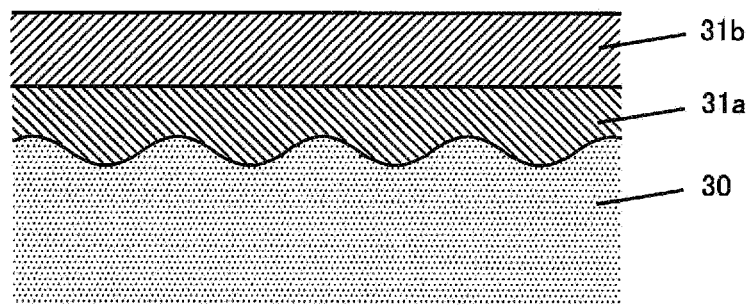
FIG. 3B is a diagram illustrating another example of a coating configuration of a tubular threaded joint according to the embodiment of the present invention.

FIG. 3B is a diagram schematically illustrating a coating structure in a case where a solid coating 31a, which does not contain the lubricating particles, is formed as a first layer on the contact surface of a base body 30 of the pin 1 and/or the box 2 of the tubular threaded joint and a solid coating 31b, which contains the lubricating particles, is formed thereon as a second layer. It is preferable that, on the contact surface of the base body 30, the subsurface treatment coating for roughening be formed as illustrated in FIG. 3A, or the two layers of solid coatings be formed after roughening the contact surface itself.

[Surface Treatment of Counterpart Member]

In a case where the solid coating is formed on the contact surfaces of only one member (for example, the box 2) of the pin 1 and the box 2 of the tubular threaded joint, the contact surfaces of the other member (for example, the pin 1) that is not coated with the solid coating may be untreated. However, preferably, the above-described subsurface treatment for roughening may be performed thereon to roughen the contact surfaces. That is, the roughening can be performed by employing a blasting treatment, pickling, a chemical conversion treatment using phosphate, oxalate, borate, or the like, electro plating, composite plating in which a plated coating containing solid fine particles is formed, and a combination of two or more types thereof. At the time of fastening a counterpart member which is coated with the solid coating, the contact surfaces of the other member which does not have the solid coating exhibits good maintenance due to the anchor effect by the roughening. Accordingly, the seizure resistance of the tubular threaded joint is increased.

In addition, in order to impart antirust properties, a well-known waterproof coating such as a ultraviolet curable resin or a thermosetting resin may also be performed after the subsurface treatment, if desired. By blocking the contact with the atmosphere by the antirust coating, even when contact with water occurs due to the dew point during storage, generation of rust on the contact surfaces is prevented.

Since the surface treatment of the contact surfaces of the counterpart member is not particularly limited, the other surface treatments can also be performed. For example, various solid coatings (for example, a solid lubricating coating) which are different from the solid coating of this embodiment can be formed on the contact surface of the counterpart member.

EXAMPLES

The effect of the present invention is exemplified by the following Examples and Comparative Examples. Further, hereinafter, the contact surface including the threaded portion and the unthreaded metal contact portion of the pin is referred to as a "pin surface" and the contact surface including the threaded portion and the unthreaded metal contact portion of the box is referred to as a "box surface". Surface roughness is Rmax. "%" is "mass %" unless otherwise designated.

On the pin surface and the box surface of a coupling type premium threaded joint VAM TOP (outside diameter: 17.78 cm (7 inches), thickness: 1.036 cm (0.408 inches), including the threaded portion, the seal portion, and the shoulder portion) made of any of a Cr—Mo steel A, a 13% Cr steel B, a 25% Cr steel C shown in Table 1, the subsurface treatment shown in Table 3 was performed, and by using a composition for solid coating formation having the chemical composition shown in Table 2, a solid coating was formed under the solid coating formation conditions shown in Table 3. Regarding the average thickness of the obtained solid coating, the thickness of the solid coating at the unthreaded metal contact portion was measured by a commercially available thickness meter.

The composition for solid coating formation was prepared by preparing a mixed solvent by mixing a dipolar aprotic solvent and pure water at a predetermined ratio, adding a powdery organic resin to the mixed solvent, and stirring the resultant at a temperature of 60 to 80° C. using a stirrer to cause the resin powder to be dissolved or dispersed in the solvent. In a case where the composition contains the lubricating particles, lubricating particles are added and further stirred to cause the particles to be uniformly dispersed for the preparation. Further, in a case of a resin which is obtained in a dispersed liquid state, the solvent is prepared to be the mixed solvent according to the embodiment of the present invention, and lubricating particles are further added and stirred depending on the case, thereby forming the composition for solid coating formation.

TABLE 1

| Symbol | C | Si | Mn | P | S | Cu | Ni | Cr | Mo |
|---|---|---|---|---|---|---|---|---|---|
| A | 0.25 | 0.25 | 0.8 | 0.02 | 0.01 | 0.04 | 0.05 | 0.95 | 0.18 |
| B | 0.19 | 0.25 | 0.8 | 0.02 | 0.01 | 0.04 | 0.1 | 13 | 0.04 |
| C | 0.02 | 0.3 | 0.5 | 0.02 | 0.01 | 0.5 | 7 | 25 | 3.2 |

(Note)
The content of each element is mass %, and the balance being Fe and impurities.

TABLE 2

| No. | | Water-dispersible resin | Water | Aqueous organic solvent | Lubricating solid particles |
|---|---|---|---|---|---|
| Example 1 | | Polyamide-imide resin (15) | Pure water (balance) | NMP (50) | — |
| Example 2 | | Polyamide-imide resin (12) | Pure water (balance) | DMSO (45) | PTFE particles (5) |
| Example 3 | | Epoxy resin (12) | Pure water (balance) | GBL (40) | Amorphous graphite (10) |
| Example 4 | First layer | Mixture of polyamide-imide resin and fluororesin (12) | Pure water (balance) | DMSO (47) | — |
| | Second layer | Mixture of polyamide-imide resin and fluororesin (12) | Pure water (balance) | DMSO (47) | Amorphous graphite* (17) |
| Comparative Example 2 | | Polyamide-imide resin (10) | | Organic solvent (other than xylene) (balance) | Molybdenum disulfide (30) |

Constitution of composition for solid coating formation (mass %)

*The amount of amorphous graphite is an added amount with respect to 100 parts by mass of the total amount of resin, water, and organic solvent.

For the evaluation, in a state where protectors for protecting a pin threaded portion and a threaded portion of a box inner surface of a coupling of an oil well pipe were mounted before fastening, a weather resistance test in which all climates were simulated in the order from a frigid weather to a high temperature under the test climate conditions (humidity is relative humidity) as described in Table 4 was performed. Thereafter, the coupling was taken off, the pin surface and the box surface were visually observed, the external form of the solid coating (presence or absence of peeling, discoloration, and the like) was examined, and the hardness of the solid coating before and after the weather resistance test was measured by a pencil hardness tester. Thereafter, a repeated fastening and loosening test, which will be described later, was immediately performed, and occurrence of seizure was examined. In addition, in Table 4, under the ocean environment exposure condition, a saturated NaCl solution for a salt spray test according to the JIS standard was sprayed for the test under the conditions of +40° C. and a humidity of 98%.

In the repeated fastening and loosening test, the threaded joint was fastened at a fastening speed of 10 rpm and a fastening torque of 20 kN·m, and the seizure statuses of the pin surface and the box surface were examined after loosening. The first to fourth fastening and loosening operations were performed in a warm environment (about 20° C.). The fifth and the rest fastening and loosening operations were performed at −20° C. by cooling the periphery of the fastened part with dry ice. In a case where seizure marks

TABLE 3

| No. | Pin Subsurface treatment | Pin First layer of solid coating | Pin Second layer of solid coating | Box Subsurface treatment | Box First layer of solid coating | Box Second layer of solid coating | Steel composition |
|---|---|---|---|---|---|---|---|
| Example 1 | 1. Grinding finish (R = 3) 2. Zinc phosphate (R = 8) (t = 12) | Polyamide-imide resin (t = 25) | | 1. Grinding finish (R = 3) 2. Manganese phosphate (R = 10) (t = 15) | Polyamide-imide resin (t = 25) | | A |
| Example 2 | Sandblasting (R = 10) | Polyamide-imide resin with PTFE powder dispersed (t = 20) | | 1. Grinding finish (R = 3) 2. Ni strike plating + Cu plating (t = 10) (R = 5) | Polyamide-imide resin with PTFE powder dispersed (t = 20) | | B |
| Example 3 | Sandblasting (R = 10) | Epoxy resin with amorphous graphite dispersed (t = 30) | | 1. Grinding finish (R = 3) 2. Ni strike plating + Cu—Sn—Zn alloy plating (t = 7) (R = 5) | Epoxy resin with amorphous graphite dispersed (t = 30) | | C |
| Example 4 | Grinding finish (R = 3) | Mixture of polyamide-imide resin and fluororesin (t = 15) | Mixture of polyamide-imide resin with amorphous grpahite dispersed and fluororesin (t = 20) | Grinding finish (R = 3) | Mixture of polyamide-imide resin and fluororesin (t = 15) | Mixture of polyamide-imide resin with amorphous grpahite dispersed and fluororesin (t = 20) | A |
| Comparative Example 1 | 1. Grinding finish (R = 3) 2. Zinc phosphate (R = 8) (t = 12) | Compound grease specified in the Standard API BUL 5 A2 | | 1. Grinding finish (R = 3) 2. Manganese phosphate (R = 10) (t = 15) | Compound grease specified in the Standard API BUL 5 A2 | | A |
| Comparative Example 2 | 1. Grinding finish (R = 3) 2. Zinc phosphate (R = 8) (t = 12) | Polyamide-imide resin with molybdenum disulfide dispersed (t = 25) | | 1. Grinding finish (R = 3) 2. Manganese phosphate (R = 10) (t = 15) | Polyamide-imide resin with molybdenum disulfide dispersed (t = 25) | | A |

R: Surface roughness (μm),
t: Thickness (μm)

generated by fastening were small and re-fastening was possible after repair, fastening and loosening were continued after the repair. The results of the weather resistance test and the repeated fastening and loosening test performed thereafter are collectively shown in Table 5.

TABLE 4

| Order | Climate conditions | Temperature (° C.) | Humidity (%) | Test time |
|---|---|---|---|---|
| 1 | Thermal deterioration | +40 | Not designated | 6 days |
| 2 | Exposure to low temperature | −60 | Not designated | 3 days |
| 3 | Temperature change | +20 / −20 | 98 / Not designated | Total of 36 cycles of 4 hours per each temperature |
| 4 | Hot and humid | +40 | 98 | 5 days |
| 5 | Exposure to ocean environment (salt spray) | +40 | 98 | 2 days |
| 6 | Exposure to high-temperature steam | −40 / +100 | Not designated / 98 | 1 hour / 1 minute |

TABLE 5

| | No. | Seizure occurrence status (numeral value: the number of fastening operations) | | | | | | | | | | Weather resistance test result | Note |
|---|---|---|---|---|---|---|---|---|---|---|---|---|---|
| | | 1 | 2 | 3 | 4 | 5 | 6 | 7 | 8 | 9 | 10 | | |
| Examples | 1 | ○ | ○ | ○ | ○ | ○ | ○ | ○ | ○ | Δ | Δ | No change | |
| | 2 | ○ | ○ | ○ | ○ | ○ | ○ | ○ | ○ | ○ | ○ | No change | |
| | 3 | ○ | ○ | ○ | ○ | ○ | ○ | ○ | ○ | ○ | ○ | No change | |
| | 4 | ○ | ○ | ○ | ○ | ○ | ○ | ○ | ○ | ○ | ○ | No change | |
| Comparative Examples | 1 | ○ | ○ | ○ | ○ | ○ | Δ | Δ | X | | | No change | Heavy metals such as lead are contained and there is a harmful effect on human bodies and the environment, and stickiness is significant. |
| | 2 | ○ | ○ | Δ | Δ | X | | | | | | Significant coating peeling | A harmful organic solvent is used. |

(Note)
1) ○: No occurrence of seizure, Δ: Slight occurrence (seizure marks are reparable and re-tightening is possible), X: Significant occurrence (irreparable)

Example 1

On the pin surface and the box surface of the premium threaded joint made of the Cr—Mo steel having the composition A shown in Table 1, surface treatments were performed to achieve the subsurface treatment and the solid coating configuration shown in Example 1 of Table 3.

The box surface was subjected to a mechanical grinding finish (a surface roughness of 3 μm) and thereafter was immersed in a manganese phosphate chemical conversion treatment liquid at 80° C. to 95° C. for 10 minutes, thereby forming a manganese phosphate coating (a surface roughness of 10 μm) having a thickness of 15 μm.

The pin surface was subjected to a mechanical grinding finish (a surface roughness of 3 μm) and thereafter was immersed in a zinc phosphate chemical conversion treatment liquid at 75 to 85° C. for 10 minutes, thereby forming a zinc phosphate coating (a surface roughness of 8 μm) having a thickness of 12 μm.

Next, onto the pin surface and the box surface subjected to the subsurface treatment, a composition for solid coating formation made by mixing a polyamide-imide resin (Torlon™ 4000TF made by SOLVAY) as an organic resin that is soluble in a dipolar aprotic solvent, pure water, and NMP (N-methylpyrrolidone) as the dipolar aprotic solvent to have the composition of Example 1 of Table 2 was applied through spraying. Thereafter, resultant was subjected to predrying (at 80° C. for 10 minutes) and main heating (at 230° C. for 30 minutes), thereby forming a solid coating having an average thickness of 25 μm.

After mounting the protectors made of resin to the pin and the box having the solid coatings formed thereon, the weather resistance test shown in Table 4 was performed. As shown in Table 5, deterioration such as peeling, discoloration, and hardness degradation of the solid coatings of the pin surface and the box surface was not confirmed after the test. Subsequently, the repeated fastening and loosening test was performed. After the ninth loosening, slight seizure had occurred in the threaded portion of the pin surface. However, the threaded portion was repaired and continuously subjected to the test as it was, and tenth fastening and loosening could be performed.

Example 2

On the pin surface and the box surface of the premium threaded joint made of the 13% Cr steel having the composition B shown in Table 1, surface treatments were performed to achieve the subsurface treatment and the solid coating configuration shown in Example 2 of Table 3.

The box surface was subjected to a mechanical grinding finish (a surface roughness of 3 μm) shown in Table 3 and thereafter was subjected to, first, Ni strike plating, and next, Cu plating through electro plating, thereby forming a plated coating (a surface roughness of 5 μm) having a total thickness of 10 μm. The pin surface was subjected to sandblasting in which sand is blasted 80 times to have a surface roughness of 10 μm.

Next, onto the pin surface and the box surface subjected to the subsurface treatment, a composition for solid coating formation made by mixing a polyamide-imide resin (the same as that of Example 1) as an organic resin that is soluble in a dipolar aprotic solvent, pure water, DMSO (dimethylsulfoxide) as the dipolar aprotic solvent, and PTFE particles as lubricating particles at the ratio shown in Example 2 of Table 2 was applied through spraying. Thereafter, the resultant was subjected to predrying (at 85° C. for 10 minutes) and main heating (at 280° C. for 30 minutes), thereby forming a solid coating having an average thickness of 20 μm.

After mounting the protectors made of resin to the pin and the box having the solid coatings formed thereon, the weather resistance test shown in Table 4 was performed. As shown in Table 5, deterioration such as peeling, discoloration, and hardness degradation of the solid coatings of the pin surface and the box surface was not confirmed after the test. Subsequently, the repeated fastening and loosening test was performed, and fastening and loosening could be performed 10 times without the occurrence of seizure.

Example 3

On the pin surface and the box surface of the premium threaded joint made of the 25% Cr steel having the composition C shown in Table 1, surface treatments were performed to achieve the subsurface treatment and the solid coating configuration shown in Example 3 of Table 3.

The box surface was subjected to a mechanical grinding finish (a surface roughness of 3 μm) and thereafter was subjected to, first, Ni strike plating, and next, Cu—Sn—Zn alloy plating through electro plating, thereby forming a plated coating (a surface roughness of 5 μm) having a total thickness of about 7 μm. The pin surface was subjected to sandblasting in which 80th sand is blasted to have a surface roughness of 10 μm.

Next, onto the pin surface and the box surface subjected to the subsurface treatment, a composition for solid coating formation made by mixing a commercially available water-dispersible epoxy resin (MODEPICS301 (registered trademark) made by Arakawa Chemical Industries, Ltd., obtained in a water-dispersed liquid state) as an organic resin that is partially soluble at least in a dipolar aprotic solvent, GBL (γ-butyrolactone) as the dipolar aprotic solvent, and amorphous graphite as lubricating particles at the ratio shown in Example 3 of Table 2 was applied through spraying. Thereafter, the resultant was subjected to predrying (at 80° C. for 10 minutes) and main heating (at 230° C. for 30 minutes), thereby forming a solid coating having an average thickness of 20 μm.

After mounting the protectors made of resin to the pin and the box having the solid coatings formed thereon, the weather resistance test shown in Table 4 was performed. As shown in Table 5, deterioration such as peeling, discoloration, and hardness degradation of the solid coatings of the pin surface and the box surface was not confirmed after the test. Subsequently, the fastening and loosening test was performed, and fastening and loosening could be performed 10 times without the occurrence of seizure.

Example 4

On the pin surface and the box surface of the premium threaded joint made of the Cr—Mo steel having the composition A shown in Table 1, surface treatments were performed to achieve the subsurface treatment and the solid coating configuration shown in Example 4 of Table 3.

The pin surface and the box surface were subjected to a mechanical grinding finish (a surface roughness of 3 μm). Onto the pin surface and the box surface, first, as a first layer, a composition for solid coating formation made by mixing a mixture (the mass ratio of polyamide-imide resin/fluororesin=70/30 in terms of solid content) of a polyamide-imide resin (the same as that of Example 1) as an organic resin that is soluble in a dipolar aprotic solvent and a commercially available water-dispersible fluororesin (POLYFLON (registered trademark) PTFE D-210C made by DAIKIN INDUSTRIES, ltd., obtained in a water-dispersed liquid state), and as the balance, pure water and DMSO as the dipolar aprotic solvent at the ratio shown in the first layer of Example 4 of Table 4 was applied through spraying. Thereafter, the resultant was subjected to predrying (at 80° C. for 10 minutes). Next, as a second layer, a composition for solid coating formation made by further adding and dispersing 17 parts by mass of amorphous graphite in 100 parts by mass of the composition for solid coating formation for the first layer was applied through spraying. Thereafter, the resultant was subjected to predrying (at 80° C. for 10 minutes) and main heating (at 230° C. for 30 minutes). Accordingly, a solid coating in which the first layer and the second layer have a total average thickness of 35 μm was formed. As shown in Table 3, the thickness of the first layer that did not contain lubricating particles was about 15 μm, and the thickness of the second layer that contained the lubricating particles (amorphous graphite) was about 20 μm.

After mounting the protectors made of resin to the pin and the box having the solid coatings formed thereon, the weather resistance test shown in Table 4 was performed. As shown in Table 5, deterioration such as peeling, discoloration, and hardness degradation of the solid coatings of the pin surface and the box surface was not confirmed after the test. Subsequently, the repeated fastening and loosening test was performed. Fastening and loosening could be performed 10 times without the occurrence of seizure.

Comparative Example 1

On the premium threaded joint made of the Cr—Mo steel of the composition A shown in Table 1, the subsurface treatment of Comparative Example 1 of Table 2 was performed, and a grease (a compound grease in a viscous liquid form specified in the Standard API BUL 5A2) that contained heavy metals such as lead was applied thereto.

The box surface was subjected to a mechanical grinding finish (a surface roughness of 3 μm) and thereafter was immersed in a manganese phosphate chemical conversion treatment liquid at 80 to 95° C. for 10 minutes, thereby forming a manganese phosphate coating (a surface roughness of 10 μm) having a thickness of 15 μm. Next, the compound grease was applied onto the surface subjected to the subsurface treatment, thereby forming a lubricating coating (a total amount of the compound grease applied onto the pin and the box was 50 g, and the application area thereof is approximately 1400 cm$^2$ in total)

The pin surface was subjected to a mechanical grinding finish (a surface roughness of 3 μm) and thereafter was immersed in a zinc phosphate chemical conversion treatment liquid at 75 to 85° C. for 10 minutes, thereby forming a zinc phosphate coating (a surface roughness of 8 μm) having a thickness of 12 μm. The compound grease as such was applied onto the surface thereof.

After mounting the protectors made of resin to the pin and the box, the weather resistance test shown in Table 4 was performed. As shown in Table 5, no significant changes in the lubricating coating grease on the pin surface and the box surface were confirmed after the test. In the fastening and loosening test performed subsequently, during the first to fourth fastening and loosening operations performed in a warm environment (about 20° C.), seizure had not occurred. However, in the fifth and the rest fastening and loosening operations at about −20° C., seizure had occurred in the threaded portion of the pin from the sixth fastening and loosening operation, and seizure in the eighth fastening and loosening operation was at such a level that could not be repaired. Therefore, the test was stopped.

From the results, it was determined that even though the compound grease containing heavy metal powder, which had been used from the past, was considered to have excellent seizure resistance, satisfactory performance could not be exhibited during fastening in a low temperature environment after an exposure to a hot and cold cycle of from an extremely low temperature to a high temperature.

Comparative Example 2

On the pin surface and the box surface of the premium threaded joint made of the Cr—Mo steel having the composition A shown in Table 1, surface treatments were performed to achieve the subsurface treatment and the solid coating configuration shown in Comparative Example 2 of Table 3.

The box surface was subjected to a mechanical grinding finish (a surface roughness of 3 μm) and thereafter was immersed in a manganese phosphate chemical conversion treatment liquid at 80 to 95° C. for 10 minutes, thereby forming a manganese phosphate coating (a surface roughness of 10 μm) having a thickness of 15 μm.

The pin surface was subjected to a mechanical grinding finish (a surface roughness of 3 μm) and thereafter was immersed in a zinc phosphate chemical conversion treatment liquid at 75 to 85° C. for 10 minutes, thereby forming a zinc phosphate coating (a surface roughness of 8 μm) having a thickness of 12 μm.

Next, onto the pin surface and the box surface subjected to the subsurface treatment as such, a composition for solid coating formation (corresponding to the composition described in Patent Document 1) made by mixing a polyamide-imide resin (VYLOMAX (registered trademark) HR-BNX made by TOYOBO CO., LTD.) that is soluble in a non-dipolar (non-polar) organic solvent, a mixed solvent including xylene and NMP at a mass ratio of 33 and 67 as an organic solvent, and molybdenum disulfide as lubricating particles at the ratio shown in Comparative Example 2 of Table 2 was applied through spraying. Thereafter, the resultant was subjected to predrying (at 80° C. for 10 minutes) and main heating (at 230° C. for 30 minutes), thereby forming a solid coating having an average thickness of 25 μm.

After mounting the protectors made of resin to the pin and the box having the solid coatings formed thereon, the weather resistance test shown in Table 4 was performed. As shown in Table 5, partial peeling and blisters were observed from the solid coatings of the pin surface and the box surface after the test. In the repeated fastening and loosening test performed subsequently, during the first to fourth fastening and loosening operations performed in a warm environment (about 20° C.), seizure had started to occur in the threaded portion of the pin from the third fastening and loosening operation. Thereafter, the threaded portion was repaired to continue the test. However, in the fifth fastening and loosening operation which was the fastening and loosening test performed at about −20° C., and seizure was at such a level that could not be repaired. Therefore, the test was stopped.

From the results, even in the tubular threaded joints having the solid coatings made of the similar polyamide-imide resins as such, it was apparently seen that the solid coating formed from the composition dissolved in the organic solvent of Comparative Example 2 and the solid coatings formed from the compositions dispersed in water in Examples 1 to 4 were different in the performance in the hot and cold cycle of from an extremely low temperature to a high temperature and in the seizure resistance performance in the fastening and loosening test at a low temperature.

The antirust properties of the tubular threaded joints of Examples 1 to 4 and Comparative Examples 1 and 2 were examined by performing the same subsurface treatments as those of the pin surfaces and the box surfaces of Table 3 on additionally prepared coupon specimens (70 mm×150 mm×1.0 mm thick) and forming the same solid coatings. The specimens were provided for a salt spray test (based on JIS Z2371 (corresponding to ISO 9227), a temperature of 35° C., 1000 hours) and a humidity test (based on JIS K5600-7-2 (corresponding to ISO 6270), a temperature of 50° C., a humidity of 98%, 200 hours) to examine presence or absence of rust being generated. As a result, it was confirmed that there was no rust being generated in all the Examples 1 to 4.

While the present invention has been described according to the embodiments which are considered to be preferable at this point in time, the present invention is not limited to the embodiments disclosed above. Modifications can be added in a range that does not depart from the technical idea of the present invention that can be read from the appended claims and the entire specification, and it should be understood that threaded joints according to such modifications are included in the technical scope of the present invention.

DESCRIPTION OF REFERENCE NUMERALS AND SIGNS

A: STEEL PIPE
B: COUPLING
1: PIN
2: BOX
3a: MALE THREADED PORTION
3b: FEMALE THREADED PORTION
4a, 4b: UNTHREADED METAL CONTACT PORTION
5a, 5b: SHOULDER PORTION
30: STEEL SURFACE
31a: SOLID COATING (FIRST LAYER IN TWO-LAYER CONFIGURATION)
31b: SOLID COATING (IN SINGLE-LAYER CONFIGURATION OR SECOND LAYER IN TWO-LAYER CONFIGURATION)
32: SUBSURFACE TREATMENT LAYER

The invention claimed is:

1. A tubular threaded joint comprising
a pin and a box each of which is provided with a contact surface comprising a threaded portion and an unthreaded metal contact portion,
wherein the contact surface of at least one member of the pin and the box has a solid coating formed by applying a composition for solid coating formation to the contact surface,
wherein the composition comprises a mixed solvent consisting of water and a dipolar aprotic solvent, and a powdery organic resin which is partially soluble at least in the dipolar aprotic solvent,
wherein the powdery organic resin is dissolved or dispersed in the mixed solvent, and
wherein the dipolar aprotic solvent is one or more solvents selected from the group consisting of dimethylsulfoxide and γ-butyrolactone.

2. The tubular threaded joint according to claim 1,
wherein the solid coating has: a first layer which does not contain lubricating particles; and a second layer formed thereon, which contains lubricating particles.

3. The tubular threaded joint according to claim 2, wherein a thickness of the solid coating is 5 μm to 100 μm.

4. The tubular threaded joint according to claim 1, wherein a thickness of the solid coating is 5 μm to 100 μm.

5. A tubular threaded joint comprising
a pin and a box each of which is provided with a contact surface comprising a threaded portion and an unthreaded metal contact portion,
wherein the contact surface of at least one member of the pin and the box has a solid coating formed by applying a composition for solid coating formation to the contact surface,
wherein the composition comprises a mixed solvent consisting of water and a dipolar aprotic solvent, a powdery organic resin which is partially soluble at least in the dipolar aprotic solvent, and lubricating particles,
wherein the powdery organic resin is dissolved or dispersed in the mixed solvent, and
wherein the dipolar aprotic solvent is one or more solvents selected from the group consisting of dimethylsulfoxide and γ-butyrolactone.

6. A tubular threaded joint comprising
a pin and a box each of which is provided with a contact surface comprising a threaded portion and an unthreaded metal contact portion,
wherein the contact surface of at least one member of the pin and the box has a solid coating formed by applying a composition for solid coating formation to the contact surface,
wherein the composition comprises a mixed solvent consisting of water and a dipolar aprotic solvent, and a powdery organic resin which is partially soluble at least in the dipolar aprotic solvent,
wherein the powdery organic resin is dissolved or dispersed in the mixed solvent,
wherein the dipolar aprotic solvent is one or more solvents selected from the group consisting of dimethylsulfoxide and γ-butyrolactone, and
wherein the powdery organic resin is one or more resins selected from the group consisting of a polyamideimide resin, an epoxy resin, and a fluororesin.

* * * * *